Figure 1:
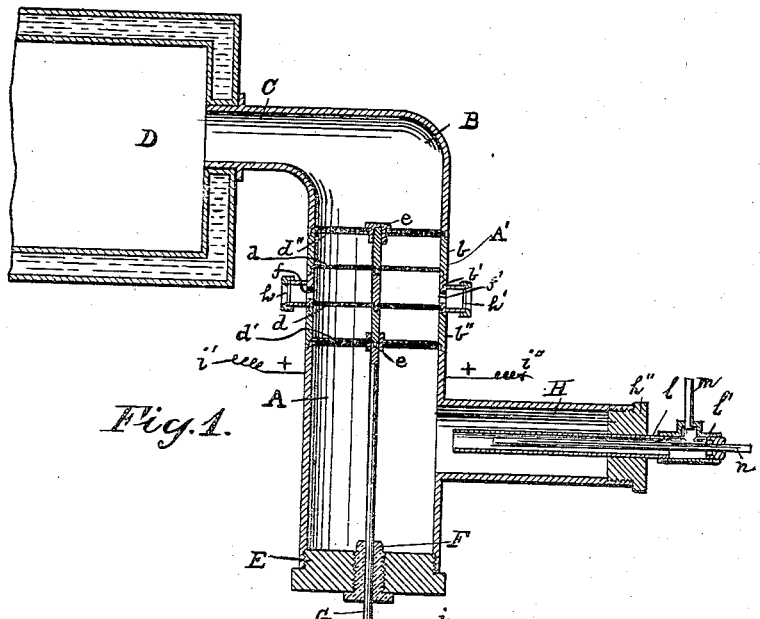

No. 868,320. PATENTED OCT. 15, 1907.
H. S. BLACKMORE.
PROCESS OF MAKING ALDEHYDES AND SOLUTIONS THEREOF.
APPLICATION FILED APR. 20, 1903.

WITNESSES.
C. C. Wright
H. W. Jenkins

INVENTOR.
Henry Spencer Blackmore

UNITED STATES PATENT OFFICE.

HENRY SPENCER BLACKMORE, OF MOUNT VERNON, NEW YORK.

PROCESS OF MAKING ALDEHYDES AND SOLUTIONS THEREOF.

No. 868,320.   Specification of Letters Patent.   Patented Oct. 15, 1907.

Application filed April 20, 1903. Serial No. 153,424.

*To all whom it may concern:*

Be it known that I, HENRY SPENCER BLACKMORE, a citizen of the United States, residing at Mount Vernon, in the county of Westchester and State of New York, have invented certain new and useful Improvements in Processes of Making Aldehydes and Solutions Thereof; and I do hereby declare the following to be a full, clear, and exact description of the invention, such as will enable others skilled in the art to which it appertains to make and use the same.

The object of my invention is to produce aldehydes and solutions thereof and consists in oxidizing hydrocarbon or substitution products thereof in the presence of a fluid capable of absorbing, occluding, or combining with the aldehyde produced in such a manner as not to injure its natural properties while maintaining the transforming ingredients at a temperature below that at which aldehyde is dissociated, by the abstraction or neutralization of heat liberated during transformation by refrigeration or other convenient means and producing solutions of the aldehyde by the final condensation of the ingredients.

My invention relates specifically to the production of formic aldehyde from methyl hydroxid (wood alcohol) by the action of oxidizing agents, such as free oxygen or oxygen-yielding compositions, while in communication with a fluid capable of absorbing, occluding, or combining with the formic aldehyde thus produced and at the same time neutralizing the heat liberated during the oxidation by absorption, such as steam; the oxidation of the methyl hydroxid may be induced by primarily heating to the point of reaction, either with direct heat or through the medium of electrical resistance, either or both of which may or may not be augmented by the presence of so-called catalytic substances, such as platinized asbestos.

In the formation of solutions of aldehydes, especially formic aldehyde, which is a gas, in water or other solvent agents, great difficulty has been found to produce solutions which will remain permanent inasmuch as there appears to be a tendency to polymerize into paraformaldehyde or trioxymethylene and intermediate polymerization products, which polymers are only with difficulty rendered utilizable for disinfectant or germicide agents.

My invention also has for another object the production of solutions of formic aldehyde and other aldehydes of permanent character with reference to spontaneous dissociation, decomposition, or polymerization, by generating the aldehyde in the presence of a solvent fluid, whereby, in its nascent condition, it appears to have the property of being absorbed, occluded, or united with the solvent vehicle in a more permanent manner and producing solutions from which the difficulty of polymerization appears to be eradicated.

In carrying out my invention for the production of formic aldehyde I proceed as follows, reference being had to the accompanying drawing which illustrates a preferred form of apparatus which I employ for the purpose.

Figures 2, 3:
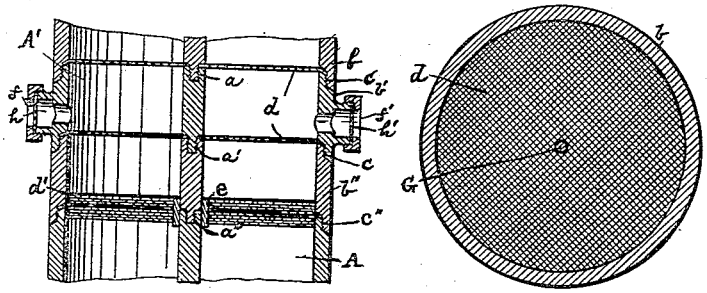

Referring to the drawing, Figure 1 is a vertical longitudinal section of my apparatus, Fig. 2 is an enlarged vertical section showing the electric diaphragms and the connections of the transforming chamber, and Fig. 3 is a cross section of one of the rings and electric connection of the transforming chamber and an electric gauze diaphragm connected therewith.

Similar letters refer to corresponding parts in the several views.

The letter A designates a transforming chamber of cylindrical or other form, provided at its top with an elbow B and pipe C, the latter connected with a jacketed condenser D in any desired, air-tight manner.

The lower end of the transforming chamber A is provided with a detachable head E, having a central stuffing box or screw-threaded plug F of insulating material connected therewith and in which is fitted a rod or electric connection G, the upper portion of which is formed in sections having screw-threaded connections, as shown at $a$, $a'$, $a''$, in Fig. 2.

The transforming chamber A, like the electric connection G, is partly composed of sections as shown at $b$, $b'$, $b''$, see Figs. 1 and 2, the said sections being joined together by the threaded ends $c$, $c'$, $c''$.

A series of metallic gauze diaphragms $d$ are arranged within the transforming chamber A, the said diaphragms being securely held in relative positions by the abutting shoulders of the screw-threaded ends of the transforming chamber rings and of the central connection thereof.

The upper and lower diaphragms $d'$ and $d''$ are arranged in several thickness, forming a heat absorber and flash preventer, and insulated from the electric connection G as shown at $e$, $e'$, for the purposes hereinafter fully described.

Peep holes $f$, $f'$, having mica fronts or covers $h$, $h'$, are located at the opposite sides of the combustion or transforming compartments A' to enable the attendant to view the interior thereof, and provide for regulating the apparatus as occasion may require.

The letters $i$ and $i'$ and $i''$ designate electric wires which are, respectively, connected with the electric conductor G and the walls of the transforming chamber A by ordinary means.

The lower part of the transforming chamber is provided, horizontally, with a pipe-section H having a detachable end or head $h''$ within which is tightly fitted a tube $l$, the latter provided with a T head $l'$ and an inlet pipe $m$; while within the stem of the T head and the tube $l$ is arranged a pipe $n$ for the purposes hereinafter fully specified.

In the operation of my invention for the production of formic aldehyde I take methyl hydroxid (wood alcohol) and vaporize it by means of heat communicated thereto through a steam coil or by the action of live steam or a current of heated gas, and convey it into the transforming apparatus described, through the pipe $n$. I then introduce oxygen or air through the pipe $m$ regulating it in about equivalent proportions to transform the methyl hydroxid into formic aldehyde as hereinafter set forth. I also introduce into the apparatus, together with the methyl hydroxid and oxidizing agent, a fluid capable of absorbing, occluding, or combining with the formic aldehyde generated to produce liquid compositions; which fluid does not injure or deteriorate the disinfectant or germicide properties of formic aldehyde and which fluid is capable of absorbing, to a large extent, the heat generated by the oxidation of the methyl alcohol, in generating the formic aldehyde, and thereby maintaining the temperature below the point at which formic aldehyde is dissociated by the action of heat. This fluid, such as steam, which I prefer to employ in making aqueous solutions, may be introduced, either as live steam through the methyl alcohol in order to vaporize the same and thence together with the methyl alcohol into the apparatus through the pipe $n$, or it can be introduced together with the oxygen, air, or other oxygen-yielding composition through the pipe $m$.

As the methyl alcohol vapor and the oxygen or oxygen-yielding composition enter the apparatus they become thoroughly mixed in the lower part of the chamber A together with the absorbing or occluding fluid, such as steam, and then pass up through the insulated gauze flash preventer $d'$ into the transforming compartment $A'$.

A current of electricity is then passed through the connections $i$, $i'$, $i''$, the same passing through the diaphragms $d$—$d$ heating them in proportion to the strength of the current to a low red heat, the said current being regulated to maintain the temperature at this point with reference to the volume of fluids passing through the gauze and excess of heat which may be liberated during oxidation or transformation, the temperature being somewhat gaged by the color of the diaphragm which can be observed through the mica-closed peepholes $f$, $f'$, or by means of thermometers suitably communicating with the inner chamber of the apparatus (not shown), as desired; as the mixture of methyl hydroxid vapor, oxygen or oxygen-yielding composition and heat absorbing fluid capable of uniting with or occluding the formic aldehyde formed, comes in contact with the heated gauze diaphragms, the oxidation of the methyl hydroxid is induced, forming formic aldehyde, which becomes thoroughly absorbed by the surrounding absorbent fluid, and yielding heat, which heat is prevented from becoming sensible to any considerable degree, by the heat-absorbing properties of the surrounding fluid. The reaction which takes place may be illustrated by the following chemical formula or equation:

$$CH_3OH + O + H_2O = \overline{CH_2O - 2H_1O}.$$

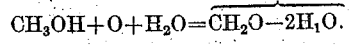

When the hydrocarbon, methane (methyl hydrid, $CH_3$—H) is employed to make formic aldehyde instead of the methane hydroxyl substitution product, methyl hydroxid, (wood alcohol $CH_3OH$), the reaction which takes place may be illustrated by the following formula or equation:

$$CH_4 + 2O + H_2O = \overline{CH_2O - 2H_2O}.$$

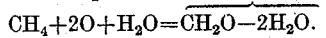

When employing methane in accordance with this formula it is introduced into the apparatus through the pipe $n$ in place of the methyl hydroxid as before described.

The temperature at which the igniting diaphragms $d$—$d$ are maintained in carrying out this process is approximately at a low red, the current of electricity being passed through the diaphragms at the commencement of the operation in proportion to heat the diaphragms to a bright red, which temperature is reduced by the first portions of fluids coming in contact therewith, to a low red. As soon as the oxidation of the methyl alcohol or methane commences, however, the heat liberated thereby naturally has a tendency to increase the temperature of the diaphragm at which time the electricity supplied to the diaphragm is gradually cut off so that the temperature of the diaphragms may be maintained at a low red by the combined action of the heat liberated during the formation of the aldehyde and the resistance of the reduced electrical current. It should be noted in the performance of this process that the formation of aldehyde by oxidation occurs in the sphere in juxtaposition to the heated diaphragms located within and surrounded by a body of heat-absorbing fluid and the temperature of the diaphragms is therefore not indicative of the temperature of the body of fluid as a whole.

The current of vapor and gas introduced passing rapidly from the apparatus carries the product of reaction quickly through and away from the heated gauze diaphragms and from the flash preventer $d''$ which consists of a number of layers of gauze, insulated as before described, from the central conductor and which also acts as a strainer or absorbent of the excess of heat not taken up by the surrounding fluid and conveys it away, thus, in combination with the heat absorbing properties of the surrounding fluid, preventing the temperature from rising to the dissociating point of the formic aldehyde produced, the absorbent fluid or steam being finally condensed in the water-jacketed condenser D carrying down with it the formic aldehyde dissolved therein in liquid condition; instead of employing steam as absorbing agent I can use aqueous moisture or other fluid introduced in any convenient manner so long as the absorbing fluid is present during the formation of the aldehyde.

It will be observed that the transforming compartment $A'$ in which the electrically heated diaphragms are located is protected at the inner and outer portions with heavy insulated gauze sections which prevents the igniting mixture of gases, in said compartment, from carrying the flash outside of the compartment and admits of controlling the temperature and the product by rapidity of admission of gases thereto during transformation, the electric diaphragms $d$—$d$ being maintained at uniform temperature.

I can produce other aldehydes by employing other alkyl hydroxids or by the oxidation of other alkyl compounds or substitution products of hydrocarbon, the neutralizing element or substituted elements or radicals of which are capable of being displaced by oxygen, without departing from the spirit of my invention which consists in oxidizing hydrocarbons or their substitution products, such as alkyl hydroxids, by the action of oxygen or oxygen-yielding substances while in the presence of a fluid capable of absorbing, occluding, or combining with the aldehyde produced without injuring its properties and also capable of absorbing the heat liberated during oxidation of the alkyl compounds to a large degree, whereby the temperature is maintained below the point at which the aldehyde is dissociated by the action of heat.

It can be readily seen that the heated diaphragms d—d in the transforming compartment A' serve to ignite the mixture of vaporous or gaseous methyl hydroxid and oxygen as it comes in contact therewith and the excess of heat either absorbed therefrom or liberated by reaction is absorbed by the surrounding heat-absorbing fluid and carried away from the heated diaphragms by the rapid flowing gases or vapors admitted, and by the heat absorbing gauze diaphragms d'', the heated diaphragms serving to induce the oxidation between the oxygen and the methyl hydroxid introduced, the heat generated being abstracted so rapidly that the temperature is maintained below the point at which the aldehyde is dissociated by the action of heat.

Instead of simply employing the heating diaphragms d—d as a means for inducing oxidation I can augment the oxidizing process by the placing between the said diaphragms of so-called catalytic or contact substances (not shown), if I so desire.

I have found by generating formic aldehyde by the oxidation of methyl hydroxid in the presence of steam and condensing the steam carrying the formic aldehyde thus generated, that the formic aldehyde seems to be occluded, retained or dissolved in the condensed steam in a more permanent manner than can be produced by other means.

Instead of steam I can also use other fluids, such as vaporized camphor oil, in which case solutions of formic aldehyde in the oil or other fluid employed, are obtained. In the case of employment of camphor oil, however, care should be taken to employ the same in such excess and to regulate the temperature of the reacting ingredients by refrigeration in such a manner, that the camphor oil does not become oxidized to the exclusion of the methyl hydroxid.

I can produce aldehyde in accordance with the process as herein set forth either under reduced or increased pressure or, in some cases, the reacting or absorbing ingredients may actually be liquid fluid instead of gaseous fluid and I can employ any convenient means for refrigeration or abstraction of heat liberated during the oxidation so long as the temperature is maintained below the point at which the aldehyde is dissociated by the action of heat without departing from the spirit of my invention.

The term "alkyl compound", as employed throughout this specification and claims, is intended to include hydrocarbons per se, such as methyl hydrid, (methane), as well as other alkyl compounds produced by the substitution of other elements or radicals for the hydrogen of the hydrocarbon, such as hydroxyl, (OH), as found in alcohols, which substituted elements or radicals are capable of being displaced together with other hydrogens of the compound by oxygen with the formation of aldehyde; and the term "gaseous", as applied to fluids throughout this specification and claims, is intended to include vaporized bodies or substances as well as gases per se which are capable, after treatment, of being condensed in liquid form, and the term "association" employed with reference to the relation of the absorbing fluid to the aldehyde, refers to fluids capable of absorbing, occluding, dissolving, or uniting with the aldehyde formed without deteriorating or affecting the natural properties of the aldehyde or which are inert to it thereby producing solutions thereof when recovered in liquid form.

Having now described my invention, what I claim as new and desire to secure by Letters Patent is:—

1. The process of making aldehydes which consists in oxidizing alkyl compounds in the presence of an aldehyde-absorbing fluid while maintaining the temperature below the dissociating point of the aldehyde desired by abstracting the heat liberated during oxidation.

2. The process of making aldehydes which consists in oxidizing substitution products of hydrocarbon in the presence of an aldehyde-absorbing fluid while maintaining the temperature below the dissociating point of the aldehyde desired by abstracting the heat liberated during oxidation.

3. The process of making aldehydes which consists in oxidizing hydroxyl substitution products of hydrocarbon in the presence of an aldehyde-absorbing fluid while maintaining the temperature below the dissociating point of the aldehyde desired by abstracting the heat liberated during oxidation.

4. The process of making formic aldehyde which consists in oxidizing methyl alcohol in the presence of an aldehyde-absorbing fluid while maintaining the temperature below the dissociating point of the aldehyde desired by abstracting the heat liberated during oxidation.

5. The process of making formic aldehyde which consists in oxidizing methyl alcohol in the presence of an aldehyde-absorbing fluid while maintaining the temperature below the dissociating point of formic aldehyde by refrigeration.

6. The process of making formic aldehyde which consists in oxidizing vaporized methyl hydroxid in the presence of an aldehyde-absorbing fluid and abstracting the heat liberated, by refrigeration, thereby maintaining the temperature below the dissociating point of the aldehyde desired.

7. The process of making formic aldehyde which consists in exposing the vapor of methyl hydroxid to the action of oxygen in the presence of an aldehyde-absorbing fluid at a reacting temperature and maintaining the temperature below the decomposing point of formic aldehyde by abstracting the heat liberated by the said reaction.

8. The process of making aldehyde solutions which consists in oxidizing alkyl compounds in the presence of a fluid capable of association with the aldehyde produced while maintaining the temperature below the dissociating point of the aldehyde desired by abstracting the heat liberated during oxidation and finally recovering the aldehyde solution in liquid form by condensation.

9. The process of making aldehyde solution which consists in oxidizing alkyl compounds in the presence of a gaseous body capable of association with the aldehyde produced while maintaining the temperature below the dissociating point of the aldehyde desired by abstracting the heat liberated during oxidation and finally recovering the aldehyde solution by condensing the said gaseous body together with the formic aldehyde.

10. The process of making aldehyde solutions which consists in oxidizing alkyl hydroxids in the presence of a fluid capable of association with the formic aldehyde while maintaining the temperature below the dissociating point of the aldehyde desired by abstracting the heat liberated during oxidation and finally recovering the formic aldehyde and associating fluid in liquid form.

11. The process of making aldehyde which consists in oxidizing an alcohol in the presence of an aldehyde-absorbing fluid capable of association with the aldehyde produced, and maintaining the temperature of the transforming ingredients below the point at which the aldehyde is dissociated by the action of heat, by the refrigerative action of heat-absorbing fluid.

12. The process of making formic aldehyde which consists in oxidizing methyl alcohol in the presence of a solvent fluid capable of associating with formic aldehyde while maintaining the temperature below the point at which formic aldehyde is dissociated by the action of heat by abstracting the heat liberated during oxidation.

13. The process of making formic aldehyde which consists in oxidizing methyl alcohol in the presence of a formic aldehyde-absorbing fluid while maintaining the temperature below the dissociating point of formic aldehyde by refrigeration.

14. The process of making formic aldehyde which consists in oxidizing vaporized methyl alcohol while in the presence of a formic aldehyde-absorbing fluid and abstracting the heat liberated thereby by refrigeration, thereby maintaining the temperature below the dissociating point of said formic aldehyde.

15. The process of making formic aldehyde which consists in exposing the vapor of methyl hydroxid to the action of oxygen at a reacting temperature in the presence of a formic aldehyde-absorbing fluid and maintaining the temperature below the dissociating point of formic aldehyde by abstracting the heat liberated during oxidation.

16. The process of making formic aldehyde which consists in oxidizing methyl hydroxid in the presence of steam and maintaining the temperature below the dissociating point of formic aldehyde by abstracting the heat liberated by the said reaction.

17. The process of making formic aldehyde which consists in oxidizing methyl hydroxid in the presence of steam while maintaining the temperature below the dissociating point of formic aldehyde by the abstraction of heat and condensing the formic aldehyde thus generated together with the steam thereby producing an aqueous solution of the same.

18. The process of making formic aldehyde which consists in oxidizing methyl hydroxid and maintaining the temperature below the dissociating point of formic aldehyde by the action of steam and finally condensing the formic aldehyde and steam thereby producing an aqueous solution of formic aldehyde, substantially as described.

19. The process of making aldehydes which consists in establishing a sphere of reaction between alkyl compounds and oxidizing agents within a body of heat-absorbing aldehyde solvent fluid and maintaining the reaction therein by supplying reacting ingredients thereto while maintaining the temperature within the said sphere at a reacting point and below the temperature at which the aldehyde dissociates by the action of heat.

In testimony whereof I affix my signature, in presence of two witnesses.

HENRY SPENCER BLACKMORE.

Witnesses:
C. C. WRIGHT,
H. N. JENKINS.